2 Sheets—Sheet 1.
T. H. MYERS.
SHOVEL-PLOW AND CULTIVATOR.
No. 194,713. Patented Aug. 28, 1877.
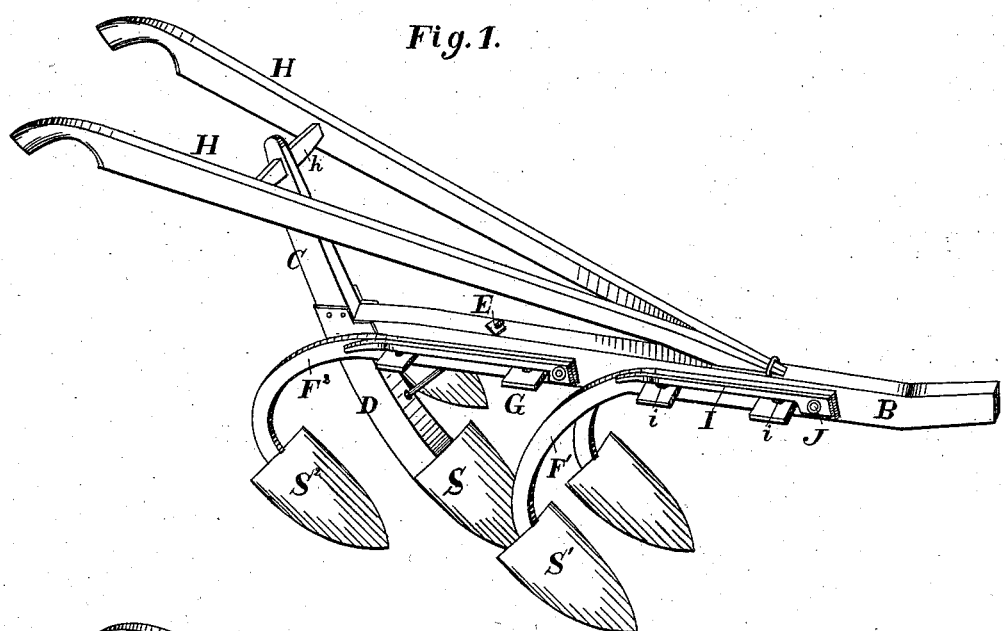
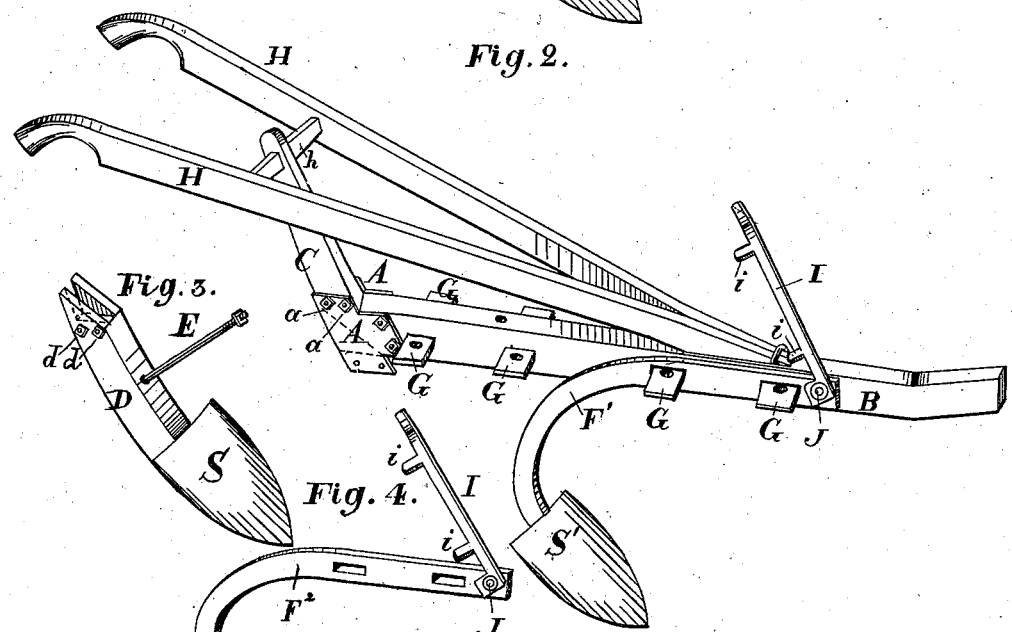
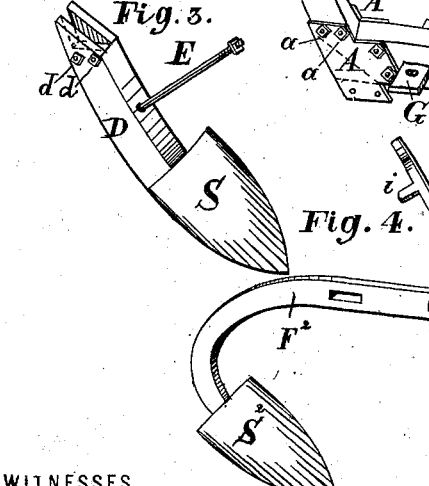
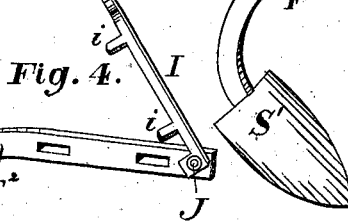
WITNESSES
Chas. J. Gooch
L. Blond Burdett
INVENTOR
Teoter H. Myers
By Knight Bros. Attorneys

T. H. MYERS.
SHOVEL-PLOW AND CULTIVATOR.

No. 194,713. Patented Aug. 28, 1877.

WITNESSES
Chas J. Gooch
L. Blond Burdett

INVENTOR
Teoter H. Myers
By Knight Bros, Attorneys

UNITED STATES PATENT OFFICE.

TEOTER H. MYERS, OF PLEASANT DALE, WEST VIRGINIA, ASSIGNOR TO JOHN W. PAINTER AND JOSHUA S. VEACH, OF STRASBURG, VIRGINIA.

IMPROVEMENT IN SHOVEL-PLOW AND CULTIVATOR.

Specification forming part of Letters Patent No. 194,713, dated August 28, 1877; application filed May 4, 1877.

*To all whom it may concern:*

Be it known that I, TEOTER H. MYERS, of Pleasant Dale, in the county of Hampshire and State of West Virginia, have invented a certain new and Improved Shovel-Plow and Cultivator, of which the following is a specification:

My improved implement is constructed, preferably, with five shovels, detachably connected to the beam, the central one by means of a mortise standard and tie-brace, and the lateral ones by means of mortises fitting over stationary tenons on the sides of the beam, and fastened by hinged latches or pins, the standards of the lateral shovels having diverse projection sidewise, so as to cause them to cut furrows asunder at regular distances, as hereinafter described.

The detachability of the standards adapts the implement to be used with any desirable number of shovels, and to be reversed for use on a hill-side.

Figure 5:
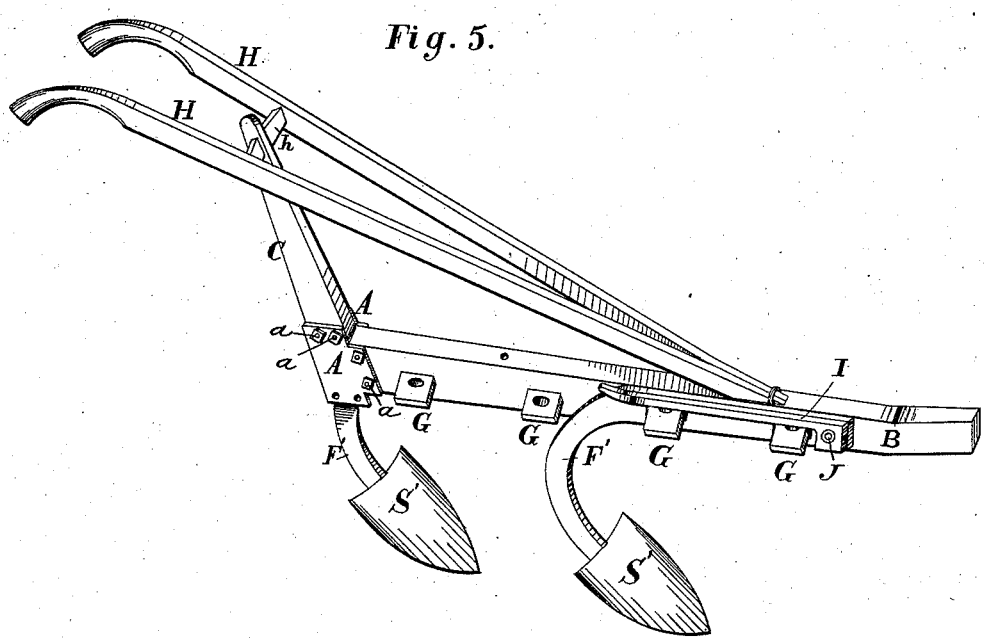
Figure 6:
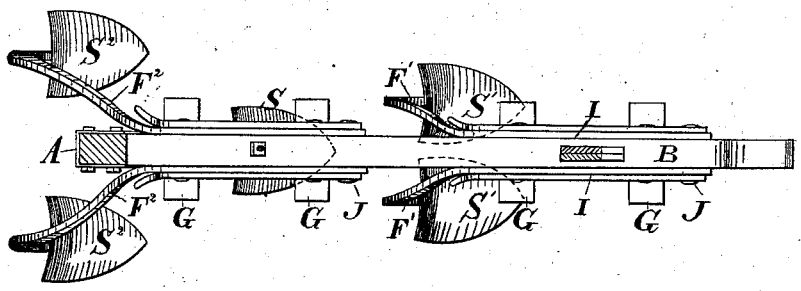

In the accompanying drawings, Figure 1 is a perspective view of the implement complete for use as a cultivator. Fig. 2 is a perspective view of the beam, with one of the lateral shovels in position ready to be fastened. Fig. 3 is a perspective view of the central shovel and its stretcher detached. Fig. 4 is a perspective view of one of the lateral shovels detached. Fig. 5 is a perspective view of the implement as adjusted for a double-shovel plow. Fig. 6 is a plan of the cultivator, with the handles omitted, representing the diverse lateral projection of the forward and rear shovels.

From the rear end of the beam B projects upward a short standard, C, in which is mortised the stretcher $h$ of the handles H H in customary manner. At the intersection of the short standard C and beam B are applied on each side strengthening-plates A A. These plates may consist of a single strap passing around at back, lapping over both sides, as shown, and secured by through-bolts $a$. D is a detachable standard, carrying the central shovel S. The upper end of the said standard is mortised to fit the beam, and beveled to fit the short standard C, and is firmly connected to the frame by bolts $d$ passing through the said plates A A at the upper part of the standard D, and by a tie-brace, E, extending diagonally from the front of the standard D, near its center, and passing upward through the beam B. $F^1 F^2$ are mortised standards, fitting over stationary tenons G G, which project horizontally from the sides of the beam, and secured to the said tenons by latches I, provided with pins $i$ projecting from their lower edges, so as to enter the holes in the tenons G G. The latches I are hinged to the forward ends of the respective standards at J. The standards $F^1 F^2$ are formed with a diverse lateral projection, so that the rear shovels $S^2$ may cut furrows at a greater distance from the center than the forward shovels $S^1$, while the central shovel S cuts a furrow between those produced by the forward shovels $S^1$. The removable standards or stocks $F^1 F^2$, and the tenons G, on which they are fitted, are all preferably made of iron or steel.

My improvement will be seen to constitute at will a single-shovel or double-shovel plow, or a cultivator with three or five shovels, as required, and by adjusting the shovel-stocks backward on their tenons the implement is adapted to plow back and forth on a hill-side, each shovel filling the furrows one after the other, and turning the earth downhill, going either way.

My invention is applicable to the common wooden single-shovel plow by simply cutting off the stock or standard at the mortise of the beam diagonally, as illustrated by the dotted line in Fig. 2, the upper part of the stock being fastened permanently to the beam, and the lower part being removable and secured by side plates, through-bolts, and tie-brace, as hereinbefore described.

The false colter or standard D is made movable for the purpose of adapting the implement for use as a double-shovel plow, as illustrated in Fig. 5, the forward standard $F^1$ on one side being set back to the rear tenons G, so as to give the two shovels the proper distance asunder, and the standards $F^2 F^2$, which have a wider lateral or side bend for the purposes of a cultivator being dispensed with when the implement is adjusted for a double-shovel plow.

My invention will be understood from the above description to be one of great value, as I am enabled to provide in one implement a convertible single-shovel plow, or a double-shovel plow, or a treble-shovel plow, or a hillside plow, or a four-shovel cultivator, or a five-shovel cultivator.

Having thus described my invention, the following is what I claim as new, and desire to secure by Letters Patent—

1. The combination of the beam B, the stock C, the removable standard D, fitted to the end of the stock C by an oblique joint gained for the reception of the beam-tenon, and secured by the side plates A A, bolts $d\ d$, and brace-rod E, as and for the purposes set forth.

2. The combination of the removable lateral stocks or standards $F^1\ F^2$, the stationary tenons G G, and the hinged latches I, formed with pins $i$, as and for the purposes described.

TEOTER H. MYERS.

Witnesses:
GEORGE SPAID,
WEBSTER EICHELBERGER.